UNITED STATES PATENT OFFICE 2,419,692

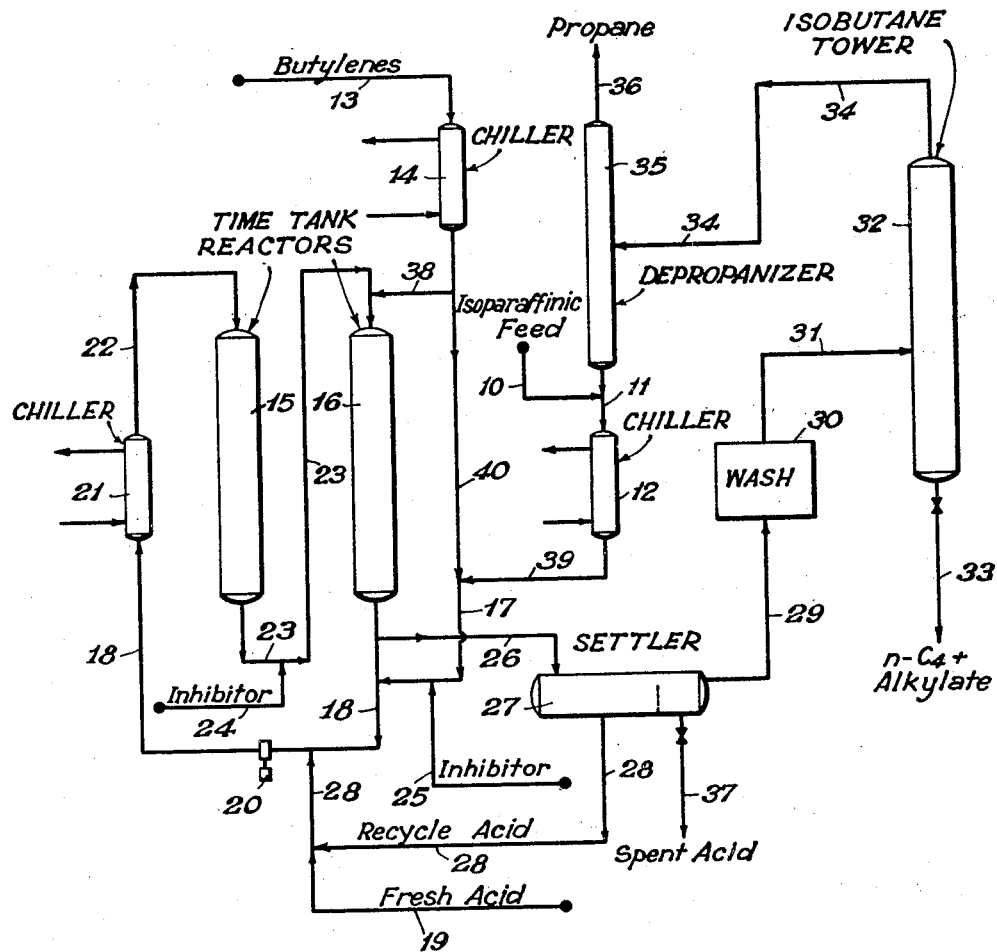

ALKYLATION

Bernard H. Shoemaker, Hammond, Ind., and Bernard L. Evering, Chicago, Ill., assignors to Standard Oil Company, Chicago, Ill., a corporation of Indiana Application December 10, 1943, Serial No. 513,769

3 Claims. (Cl. 260—683.4)

The present invention relates to a process of reacting olefins and olefin polymers with other hydrocarbons with special reference to the production of saturated hydrocarbons. It pertains particularly to the alkylation of isoparaffins with an olefin, such as ethylene, propylene, butylene, amylene, for producing aviation gasoline and motor fuels and the alkylation of isoparaffinic hydrocarbons with the polymers of ethylene, propylene, butylene, etc., to produce high molecular weight saturated oils. More particularly, the present invention is directed to a method for controlling the type of product by such a reaction.

It is known that saturated hydrocarbons containing tertiary carbon atoms, hereinafter referred to as isoparaffins, will react with olefins and olefin polymers in the presence of various acid alkylation catalysts, such as sulfuric acid, hydrogen fluoride and mineral acids activated by one or more of HBr, HCl, BF₃, SO₃, H₂O, etc. and other catalysts of this general type to produce a wide range of products. The reactions involved are extremely complicated and are little understood. It is known that the nature of the reaction product will vary with the reaction conditions, with the type of mixture employed as starting materials, and with the particular catalyst selected. For a given feed and for a given set of operating conditions, however, the nature of the product produced; i. e., the product distribution, by the procedure heretofore followed is beyond the control of the operator. A broad object of our invention is to provide an improvement in systems of this general type which offers important commercial advantages over any such process heretofore known to the art.

Isoparaffins and olefins undergo reactions in the presence of the alkylation catalysts to produce a variety of products chiefly paraffinic hydrocarbons of branched chain structure. Prior to our invention, however, such conversions have resulted in considerable amounts of cracking, disproportionation, or other side reactions, so that the conversion of a narrow boiling range charging stock has resulted in a relatively wide boiling range product. This is particularly undesirable in the production of aviation fuel components since the products of cracking and disproportionation are of lower octane number than the alkylate, particularly those boiling above the desired alkylate. In addition, the side reactions apparently decrease the life of the alkylation catalyst.

According to the present invention, the product distribution is controlled to a very desirable degree by maintaining within the reaction zone a controlled amount of an aromatic, such as benzene, as a cracking or disproportionation inhibitor. The addition of a cyclic cracking inhibitor lowers the rate of cracking and disproportionation, but does not adversely effect the rate of alkylation to a corresponding degree. The mechanism of the reaction, however, is not clearly understood and we do not wish to be bound by any theory of reaction. Nevertheless, it is a fact that the addition of controlled amounts of these materials results in improved yields of the desired alkylate.

It is, therefore, an object of our invention to provide methods and means in such processes for avoiding undesirable side reactions, e. g. to suppress cracking, disproportionation, and the like. A further object of our invention is to direct the hydrocarbon conversions primarily toward alkylation and to avoid such side reactions as the cracking of charging stock and products to low molecular weight hydrocarbons or the conversion of charging stock into higher molecular weight hydrocarbons than desired or to produce products of unsatisfactory octane number. Another object is to prolong catalyst activity and catalyst life, or, in other words, to produce a larger yield of desirable alkylation products per pound of catalyst material than has heretofore been possible. We attain these and other objects, which will be apparent as the detailed description of the invention proceeds, by effecting alkylation of hydrocarbons in the presence of a disproportionation or cracking inhibitor comprising an aromatic.

We contemplate using aromatics such as benzene to control the side reactions occurring simultaneously with alkylation when using acid type catalysts such as sulfuric acid, activated sulfuric acid, hydrogen fluoride, and acids activated with HBr, HCl, BF₃, SO₃, H₂O, etc.

Not all aromatics are equally desirable as inhibitors, their effectiveness apparently depending on the availability of the carbon atoms in the ring structure to which an alkyl may attach. Thus hexaalkyl benzenes are ineffective. Their effectiveness increases as the number of alkyl groups attached to the ring is decreased with benzene being the most desirable.

When our inhibitors are used we contemplate that more drastic reaction conditions can be employed thereby obtaining a process which is more efficient and is less sensitive to operating conditions. Our invention makes it possible to use smaller reactors, higher concentrations of catalyst, higher temperatures, catalysts of wider ranges of activity, etc. Thus our process has the advantage of being less sensitive to the operating conditions and the need of special control equipment is minimized.

In practicing our invention we effect the alkylation of isoparaffins and olefins in the presence of the selected catalyst while maintaining in the alkylation zone a small critical amount of an inhibitor. A preferred example of such inhibitor is an aromatic hydrocarbon such as benzene. Thus benzene may be added in small critical amounts with the alkylation charge or separately and by using such inhibitors we may employ even more severe reaction conditions and catalyst of a wider range of activity without causing an undue amount of cracking.

The invention will be more clearly understood from the following example, and the detailed description read in conjunction with the accompanying drawing which forms a part of this specification and which is a schematic flow diagram of an embodiment of an alkylation system employing the cracking or disproportionation inhibitor.

As isoparaffinic hydrocarbons suitable for our process we can employ low boiling isoparaffins such as isobutane, isopentane, isohexane, or mixtures of any two or more of these hydrocarbons either with or without the corresponding normal paraffins. The olefins can comprise such olefins as ethylene, propylene, the butylenes and amylenes or may include higher boiling olefins or polymers. The term "butylenes" as employed in the description of our process is intended to include either the normal butenes or isobutylene or mixtures thereof.

A substantial molar excess of isoparaffins to olefins should be maintained within the reaction zone. The effluent product stream leaving the alkylation step is substantially free from olefins and the alkylate is separated from the lower boiling paraffins. The paraffins are fractionated to give an isoparaffin recycle stream for the alkylation step. Any normal paraffin can be recycled to an isomerization step which may supply the isoparaffin for the alkylation. The inhibitors can optionally be cycled with the normal paraffins to the isomerization step where they are likewise advantageous. It is also contemplated that the inhibitor and/or its reaction products can be included beneficially in the alkylate fraction.

The drawing illustrates one modification of our invention wherein isooctane is produced by the alkylation of isobutane with butylenes in the presence of strong sulfuric acid as the catalyst. Similar apparatus may be used in the alkylation of isobutane or other low boiling isoparaffin with propylene or amylenes. Likewise other catalysts can be used. Isoparaffinic feed may be introduced by line 10 into the system. If desired, the feed may have been prepared by passing through a feed preparation tower to remove any pentanes, etc., followed by caustic wash of the feed before being introduced into the isobutane line 11. Alternatively the fresh feed can be introduced into the product wash and isobutane systems. Isobutane, feed and recycle, are passed by line 11 into chiller 12. Olefin feed is introduced by line 13, passed through chiller 14, line 40, and mixed with the isobutane from 39. The mixture of isobutane and olefin is then introduced by line 17 into the emulsion recycle line 18. If desired olefins can be introduced between stages by line 38. The external or feed ratio of isoparaffin to olefin is maintained at about 4:1. However, by recycle the internal or reacting isoparaffin to olefin ratio is maintained at between about 100 and 150:1.

Fresh acid is introduced by line 19 and added to the emulsion in line 18. Pump 20 in line 18 passes the reaction mixture through chiller 21, line 22, and into time tank 15. The reaction mixture then flows by line 23 into a second time tank 16. In the operation of the unit for alkylating olefinic hydrocarbons and isobutane, low temperatures such as 35 and 50° F. are desirable to obtain good yield and product quality. The reaction temperature ordinarily will be at about 40° F. with a maximum of about 50° F. for butylene alkylation and about 60° F. for amylenes when acid concentrations are between about 90 and 105%. These temperatures may be increased considerably when the cyclic hydrocarbon inhibitors are added in accordance with our invention. Likewise acids of lower strength can be used. Ordinarily, however, the second reactor will be at a higher temperature than the first and we contemplate introducing a cyclic cracking or disproportionation inhibitor by line 24. The inhibitor also may be introduced by line 25 along with the fresh feed to the alkylation. We contemplate using between about 0.05 and 2.5% preferably about 0.1 to 1.5% by volume of aromatic, such as benzene, based on reactor hydrocarbon charge.

The effluent from reactor 16 is split with a portion of the hydrocarbon-acid emulsion being passed by line 26 into settler 27. The balance of the emulsion is recycled by line 18 and line 22 to time tank 15. The acid emulsion is maintained at about 40 to 50% acid. Within settler 27 the recycle acid is separated, withdrawn by line 28 and returned to the reactor system by line 18. The acid strength is maintained above about 85%, spent acid being periodically or continuously withdrawn by valved line 37. The hydrocarbon fraction is withdrawn from settler 27 by line 29 and subjected to a caustic wash diagrammatically illustrated at 30. The concentration of isobutane in the reactor effluent is maintained at about 30 to 40%. The alkylate and unreacted hydrocarbons are introduced by line 31 into isobutane tower 32. Normal butane and alkylate are withdrawn by bottom drawoff line 33, the unreacted hydrocarbons being withdrawn overhead by line 34 and introduced into depropanizer 35. Propane is withdrawn overhead by line 36 and isobutane recovered as bottoms from the depropanizer which is recycled by line 11.

We have described our invention in terms of preparation of aviation gasoline hydrocarbons by alkylation in the presence of an added cyclic hydrocarbon as a cracking or disproportionations inhibitor. It will be apparent from the above description that our invention has broader aspects. For example, one of the drawbacks in the formation of white oils by alkylating olefin polymers with an isoparaffin such as isobutane or isopentane, is the tendency for the polyolefin to be depolymerized. We contemplate the inclusion of benzene as cracking, disproportionation and depolymerization inhibitors in the alkylation of olefin polymers to make white oils. Thus a plant butane stream which ordinarily comprises a mixture of isobutylene, n-butylene, n-butane and isobutane is contacted with a polymerization catalyst and the unsaturated hydrocarbons in the $C_4$ stream are rapidly polymerized. The average molecular weight of the polymer may vary from about 300 to 1000 depending upon the temperature of polymerization. These polymers on contact with an isoparaffin in the presence of an acid alkylation catalyst can be converted to saturated hydrocarbons. If desired, the polymerization and alkylation may be carried out in series in separate towers with extraneous isobutane or isopentane introduced only into the second reaction zone. In another modification the total reaction is conducted within a single elongated zone with additional isoparaffin being introduced at vertically spaced points. It is also contemplated that only a fraction of the total polymer may be slowly added to a well agitated mixture of isoparaffin, catalyst and inhibitor such as benzene. In any case a renewed quantity of the aromatic hydrocarbon inhibitor is maintained within the zone wherein the alkylation occurs and thereby inhibits depolymerization of the relatively high molecular weight olefinic polymer. When the polymer is produced in a separate zone and only a fraction is used in the alkylation, the off-gases from the polymerization are a suitable source of isoparaffins for the alkylation step.

It is contemplated that modifications in the apparatus and process other than those described above and illustrated in the drawing can be made so as to obtain the optimum results with the selected type of alkylation catalyst. In each case, however, means should be provided for maintaining the inhibitor within the alkylation zone, the inhibitor being introduced at one or more points in the system, either independently or blended with one of the other fluids introduced into, withdrawn from, or circulated in, the system. Various means for obtaining the desired temperature control, degree and time of contact with the catalyst, high isoparaffin to olefin ratio, etc., can be used without departing from our invention. Hence, the chilling can be supplied by indirect refrigeration with propane or ammonia or by direct auto-refrigeration or indirect chilling with butanes as the refrigerant. Additional pressuring and/or cooling means can be provided to maintain the selected alkylation catalyst in the liquid phase during the contacting. Likewise a plurality of parallel time tanks may be used in series on the isoparaffin and in parallel on olefins. The acid cycle may be in series on fresh acid and parallel on recycle acid. The reactor itself may be of various types and it should be understood that we contemplate the use of various continuous reactors either of the agitator, the circulator-mixer, the tower, or the jet and time tank types. For example, it may be a contactor of the type described in U. S. Patent 2,238,802. In any of the systems the contactors may be provided with means for bottom withdrawal of the catalyst.

Therefore, although we have described in more or less detail preferred embodiments of our invention, it should be understood that the invention is not limited to any of the details hereinabove set forth and that we contemplate modifications of the invention which will be apparent from the above description to those skilled in the art.

We claim:

1. The method of synthesizing hydrocarbons boiling within a narrow range which method comprises contacting isoparaffinic and olefinic hydrocarbons with a mineral acid alkylation catalyst at a temperature of between about 40 and 60° F. within a first contacting zone, withdrawing the reaction mixture from said first contacting step, supplying the withdrawn reaction mixture to a second contacting zone, commingling between about 0.1 and about 1.5 per cent of benzene, based upon the volume of total hydrocarbons supplied to the second contacting zone, with the reaction mixture and contacting the reaction mixture and added benzene in the second contacting zone at a temperature substantially above that employed in the first contacting step, the added benzene inhibiting the normal tendency for the alkylation catalyst to disproportionate the alkylation product at the higher alkylation temperature.

2. The method of synthesizing hydrocarbons which comprises maintaining a first pool of a mineral acid alkylation catalyst within a first contacting zone at a temperature of between about 40 and 60° F., maintaining a second pool of a mineral acid alkylation catalyst of lower alkylating activity within a second contacting zone at a temperature appreciably above that in the first contacting zone, introducing isoparaffinic and olefinic hydrocarbons into said first contacting zone, transferring reaction mixture from said first contacting zone to said second contacting zone, introducing olefinic hydrocarbons into said second contacting zone, introducing into said reaction mixture between about 0.1 and about 1.5 per cent by volume of an alkylatable aromatic based upon the volume of total hydrocarbons supplied to the second alkylation step whereby side reactions resulting from cracking and disproportionation of the alkylate at the higher temperature are minimized, effecting alkylation of at least a portion of said aromatic with a portion of the added olefinic hydrocarbons and recovering from the reaction products a liquid fraction including isoparaffinic and aromatic alkylate.

3. The method of synthesizing hydrocarbons boiling within a narrow range which comprises the steps of contacting a molal excess of isoparaffins with olefins in the presence of sulfuric acid alkylation catalyst at a temperature of between about 40 and about 60° F. whereby substantially all of the olefinic hydrocarbons are consumed and the activity of the alkylation catalyst is diminished, withdrawing the total reaction mixture from the contacting step, adding olefinic hydrocarbons to the reaction mixture and introducing the reaction mixture and olefins into a second contacting step, maintaining within said second step between about 0.1 and 1.5 per cent by volume of benzene based upon the volume of total hydrocarbons introduced into said second step, effecting alkylation of isoparaffins and aromatics with olefins in said second step at a temperature substantially above that employed in the first stage whereby the normal tendency for the alkylation catalyst to disproportionate the alkylation product is inhibited, and recovering from the reaction products a liquid fraction including isoparaffinic and aromatic alkylate boiling within a narrow range.

BERNARD H. SHOEMAKER.
BERNARD L. EVERING.

REFERENCES CITED

The following references are of record in the file of this patent:

UNITED STATES PATENTS

| Number | Name | Date |
|---|---|---|
| 2,322,664 | Russel | June 22, 1943 |
| 2,267,457 | Goldsby | Dec. 23, 1941 |